United States Patent [19]
Aratani

[11] Patent Number: 5,243,590
[45] Date of Patent: Sep. 7, 1993

[54] OPTICAL DISC

[75] Inventor: Katsuhisa Aratani, Chiba, Japan

[73] Assignee: Sony Corporation, Tokyo, Japan

[21] Appl. No.: 783,167

[22] Filed: Oct. 28, 1991

[30] Foreign Application Priority Data

Oct. 31, 1990 [JP] Japan .................. 2-291773

[51] Int. Cl.⁵ .............................. G11B 7/00
[52] U.S. Cl. ................................. 369/109
[58] Field of Search ........................ 369/109

[56] References Cited

U.S. PATENT DOCUMENTS

| | | | |
|---|---|---|---|
| 4,238,803 | 12/1980 | Terao et al. | 369/109 |
| 4,290,075 | 9/1981 | Jacobs et al. | 369/275.1 |
| 4,787,077 | 11/1988 | Barton et al. | 369/284 |
| 4,975,355 | 12/1990 | Suzuki | 430/290 |
| 5,130,971 | 7/1992 | Ohno et al. | 369/109 |

Primary Examiner—Bruce C. Anderson
Attorney, Agent, or Firm—Hill, Steadman & Simpson

[57] ABSTRACT

The present invention is concerned with an optical disc in which a layer of a material undergoing partial phase transitions within a scanning light spot of a readout light so as to be changed in this manner in its optical constants is formed on a base plate, on which phase pits are formed in advance in accordance with information signals, and in which the layer of the material is reset to its initial state, even if the pit period is less than the limit of diffraction, satisfactory reproduction free of crosstalks may be achieved to enable high density recording.

6 Claims, 3 Drawing Sheets

OPTICAL DISC

BACKGROUND OF THE INVENTION

1. Field of the Invention

This invention relates to an optical disc for reproducing information data by irradiation of a laser light. More particularly, it relates to an optical disc which may be employed advantageously for high density recording.

2. Related Art

In an optical disc, such as a digital audio disc (so-called compact disc) or a video disc, an aluminum reflective film is formed on a transparent base plate, on which phase pits have been previously formed in accordance with information signals, and a hard protective film is formed on the reflective film. When the disc surface of such optical disc is irradiated with a readout light, since the light is diffracted at the phase pits and hence the volume of reflected light is reduced significantly, the information signals may be reproduced by detecting the decrease in the volume of the reflected light.

Meanwhile, with the above described optical disc, the resolution in signal reproduction is mostly determined by the wavelength $\lambda$ of a light source of a reproducing optical system and the numerical aperture of an object lens, such that satisfactory playback signals free of crosstalk may be obtained when the period of formed pits is above the limit of diffraction ($\lambda/2NA$).

For this reason, for improving the recording density with this type of the optical disc, it is necessary to reduce the wavelength $\lambda$ of the light source of the play back optical system(semiconductor laser) and to increase the numerical aperture of the object lens.

However, the wavelength of the light source or the numerical aperture of the object lens cannot be improved beyond certain threshold values. That is, under the current state of the art, the recording density can be improved by a factor of four at most by reducing the wavelength of the light source. On the other hand, if the numerical aperture of the lens is to be increased, it becomes difficult to produce a lens which is subject to aberration to a lesser extent. Even granting that such lens has actually been produced, focusing stability tends to be affected by disc vibrations or skew. For this reason, difficulties are felt in significantly improving the recording density of the optical disc.

OBJECT AND SUMMARY OF THE INVENTION

It is therefore a principal object of the present invention to provide an optical disc in which satisfactory playback signals may be produced and the recording density may be improved even when the pit period is below the limit of diffraction.

For accomplishing the above object, the present invention provides an optical disc comprising a layer of a material formed on a transparent base plate on which phase pits are formed in advance, said material having its optical constants such as absorption coefficient and refractive index changed by phase transitions, characterized in that said layer of the material undergoes partial phase transitions within a scanning light spot of a readout light when irradiated with the readout light, said layer of the material reverting to an initial state after termination of reading.

When an optical disc, in which phase pits are formed in advance on a transparent base plate thereof and a layer of a material changed in optical constants by phase transition is formed on the transparent base plate, is irradiated with a readout light, the layer of the material undergoes the phase transitions with rise in temperature, so that a region of a locally high reflecting is produced in a scanning light spot of the readout light. As a result, even when two or more of the phase pits formed in accordance with the information signals should be located within the scanning light spot of the readout light, changes in the reflectivity due to the presence or absence of the phase pits are detected as information signals only within a region with high reflectivity. Conversely, in a region which has not undergone the phase transitions, the reflectivity is low irrespective of the presence or absence of the phase pits, so that, even when the phase pits should be situated within the scanning light spot, the resulting changes in the reflectivity are so small that these changes are not detected as information signals. On the contrary, even when a reflectivity in a scanning light spot of the read out light is partially changed to be lower due to the phase transitions, it is also possible to improve the recording density although only in the linear recording density at this time. Besides, no particular initializing operation is necessitated because the layer of the material is reset after readout to its initialized state.

EMBODIMENTS

By referring to the accompanying drawings, certain preferred embodiments of the present invention will be explained in detail.

Figure 3:
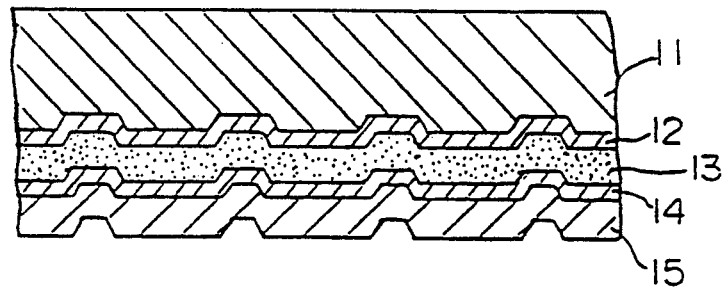
FIG. 3 is a schematic cross-sectional view showing a third embodiment of an optical disc according to the present invention.

Referring to FIG. 3, an optical disc according to a preferred embodiment of the invention includes a first dielectric film 12, a layer of a material 13, a second dielectric film 14 and a reflective film 15, sequentially formed on a transparent base plate 11 on which the phase pits are formed previously.

It is noted that the transparent base plate used herein is a so-called glass 2P base plate, and that the phase pits are formed under the conditions of a track pitch of 1.6 $\mu$m, a pit depth of ca. 1200Å and a pit width of 0.5 $\mu$m.

For the layer of the material formed on the base plate, the material satisfying the following conditions is used.

That is, the material should undergo partial phase transitions within a scanning light spot of the readout light and be reset to its initial state after the readout light has left the material, with the optical constants of the material being changed with the phase transitions.

Among the materials satisfying the above conditions, there are chalcogenide materials composed mainly of Sb, Se, Bi, Te, In, Ge and Tl, such as SbTe, SbSe, BiTe, BiSe, In-Se, In-Sb-Te, In-Sb-Se, In-Se-Tl, Ge-Te-Sb or Ge-Te. These chalcogenide materials are in crystalline state at room temperature and become amorphous with rise in temperature, while being reset to the crystalline state when the temperature is returned to room temperature under a controlled cooling rate. Optical constants of these chalcogenide materials differ significantly between the crystalline state and the amorphous state. Meanwhile, SbTe is used in the present embodiment for the layer of the material, and the film thickness of the layer has been selected to be 170 Å.

For the first and the second dielectric films, $Si_3N_4$, SiO, $SiO_2$, AlN, $Al_2O_3$, ZnS or $MgF_2$, are used. For the reflective film, materials such as Al, Cu, Ag or Au may be employed, occasionally with a minor amount of additives.

By properly selecting the material layer, dielectric film, the film thickness of the reflective film or the optical constants, the cooling rate of the layer of the material after the readout light has left it may be controlled to enable transition of the layer of the material from the amorphous state to the crystalline state. Meanwhile, as for the reflectivity $R_1$ before phase transition and the reflectivity $R_2$ after phase transition, it is preferred that $R_1=O$ and $R_2=x$ where x is not zero ($x\neq$)) and $R_2=O$. Above all, $R_1=O$ and $R_2=X$ is ($y\neq$)) and $R_2=O$. Above all, $R_1=O$ and $R_2=X$ is preferred for reducing crosstalks. Above all, even if $R_1\neq R_2\neq O$, digital signals may be reproduced by using a frequency equivalent circuit for reproduced signals. In the present embodiment, $Si_3N_4$ films with a refractive index of 1.9 and a film thickness of 900Å are used as the first and second dielectric films, while an Al film having a film thickness of 300Å is used as the reflective film. In this case, $R_2=30\%$ and $R_1<5\%$.

Figure 1:
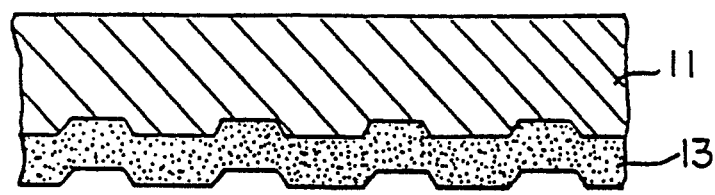
FIG. 1 is a schematic cross-sectional view showing a first embodiment of an optical disc according to the present invention.
Figure 2:
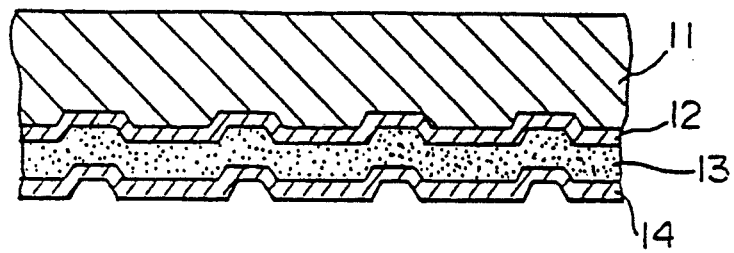
FIG. 2 is a schematic cross-sectional view showing a second embodiment of an optical disc according to the present invention.

As the construction of the optical disc, only the layer of a material 13 may be provided in tight contact with the base plate 11 on which pits are previously formed, as shown in FIG. 1. Alternatively, a first dielectric film 12, a layer of a material 13 and a second dielectric layer 14 may be sequentially formed on the transparent base layer 11, as shown in FIG. 2. Still alternatively, the reflective layer 15 may be additionally provided on the second dielectric film 14, as in the optical disc of the embodiment shown in FIG. 3.

Figure 4:
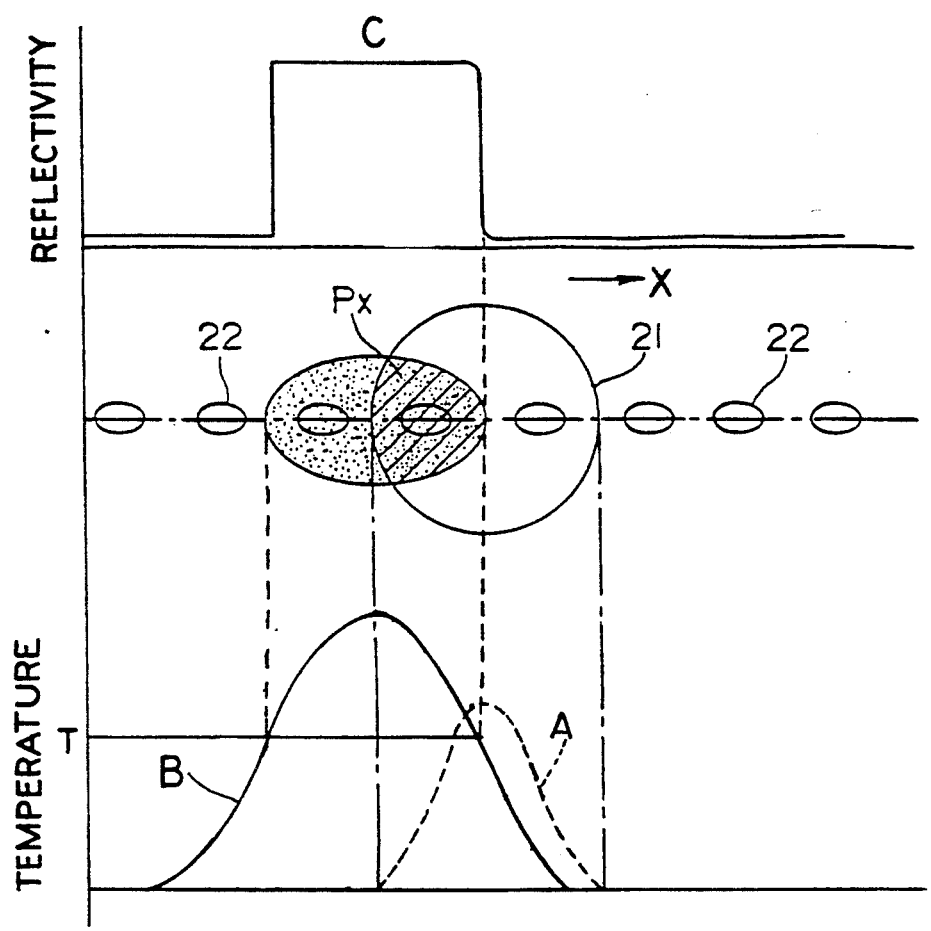
FIG. 4 is a diagrammatic view showing the state of phase transitions and changes in the reflectivity as well as a temperature distribution in the laser light spot on scanning the optical disc with a laser light spot.

If a laser beam is irradiated on the so-produced optical disc, the portion of the layer of the material irradiated with the laser light is changed to an amorphous state, so that its reflectivity is raised, as shown in FIG. 4.

That is, when a laser spot 21 is irradiated on an optical disc, the laser light intensity shows a distribution as shown by a broken line A in FIG. 4, whilst the temperature of the material layer shows a distribution which is slightly delayed from the intensity distribution in keeping with the prevailing scanning speed of the laser spot 21, as shown by a curve B in FIG. 4.

Assuming that the laser spot is scanning in the direction of an arrow X in FIG. 4, the temperature of the material layer is raised gradually, beginning at the leading end in the proceeding direction of the laser spot 21, until the temperature above the melting point T of the material layer is reached. At this stage, the material layer shifts from the crystalline state to the amorphous or liquid state, so that the reflectivity of the material is increased significantly. A region which has become amorphous at this time is indicated as $P_X$ in FIG. 4.

After the laser spot has left the material, the temperature of the material is lowered gradually, until the material layer again reaches the crystalline state. The reflectivity of the material layer along the trajectory of a mid point of the laser spot 21 during the above process is shown by a curve C in FIG. 4.

Before being heated to the melting point T by the irradiation of the laser light spot 21, the material layer is in the crystalline state and hence its reflectivity is extremely low, so that, even if phase pit(s) exist in such crystalline region, changes in the reflectivity are so small that these changes cannot be taken out as signals. Conversely, the material layer exhibits a high reflectivity in the region $P_X$ which has been heated to the melting point T by the irradiation of the laser spot 21 and has become amorphous, so that changes in the reflectivity due to the presence or absence of the phase pits 22 are taken out as signals. That is, insofar as the inside region of the laser spot 21 is concerned, the region of the laser spot which has not been heated to the melting point T is mostly irrelevant to signal reproduction, while the phase pit(s) are detected only in the region $P_X$ which has become amorphous, as shown by hatched line in FIG. 4. The result is that the laser spot is partially masked and, as it were, a window (a region with a high reflectivity) is formed within the laser spot 21, so that the laser spot 21 is equivalently reduced in diameter to enable high density reproduction exceeding the detection limit imposed by the numerical aperture of the object lens or the wavelength of the semiconductor laser.

Pits were actually formed on the base plate of the above described optical disc with pit lengths of 0.3, 0.4 and 0.5 μm, and the relation between the playback power and the signal level was checked. The results are shown in FIG. 5.

Meanwhile, the wavelength of the semiconductor laser of the reproducing optical system, the numerical aperture of the object lens ad the linear velocity were set to 780 nm, 0.53 and 5 m/s, respectively, as conditions for measurement. FIG. 5 also shows the results of calculation for the case in which the layer of the material according to the present invention is not provided and hence the playback signals may be assumed to be proportionate to the playback light volume (an uppermost curve in FIG. 5).

Figure 5:
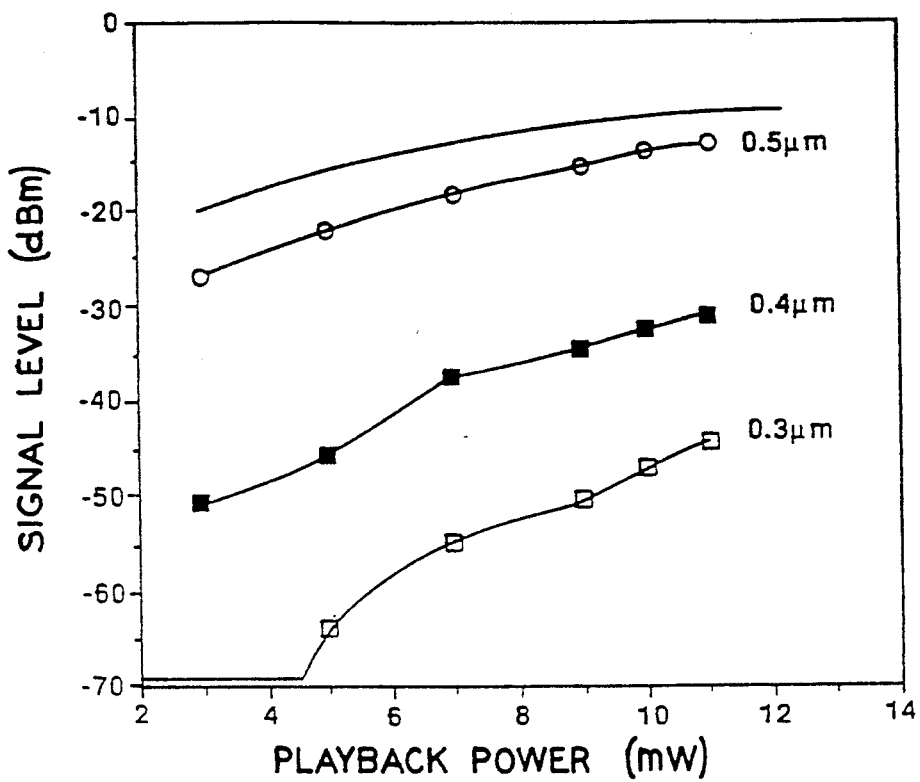
FIG. 5 is a graph showing the relation between the playback power and the signal level when reproducing the phase pits of several different pit lengths.

Referring to FIG. 5, significant deviations from the calculated values (deviations from parallelism with the uppermost curve in FIG. 5) are noticed with the pit length of 0.3 μm. This means that the reflectivity of the material layer has been changed with the playback light volume. It is also seen that, even with the pit length of 0.3 μm, playback signals may be obtained for the playback power of 5 mn or higher. Since the limit of diffraction determined by the measurement conditions used in the present embodiment is about 0.8 μm, the conventional limit of reproduction (pit length of ca. 0.4 μm) is exceeded significantly with the present optical disc.

From the foregoing it is seen that the present invention provides an optical disc in which, since the layer of a material which undergoes partial phase transition within the range of a scanning light spot of the readout light and which is thereby changed in reflectivity is formed on the transparent base plate on which phase pits are formed previously, the scanning light spot of the readout light is partially masked to diminish the diameter of the scanning light spot effectively.

In this manner,, even if the pit period is lower than the limit of diffraction, satisfactory playback signals free of crosstalk may be produced to provide for an increased recording density. On the other hand, no particular initializing operation is necessary to perform because the layer of the material is reverted to its initial state after readout is terminated.

What is claimed is:

1. AN optical disc comprising a layer of a material formed on a transparent base plate on which phase pits are formed in advance, said material having its optical constants such as absorption coefficient and refractive index changed temporarily by phase transitions,
characterized in that
said layer of the material undergoes partial phase transitions within a scanning light spot of a readout light when irradiated with the readout light, said layer of the material reverting to an initial state after termination of reading.

2. The optical disc as claimed in claim 1 characterized in that the initial state of said layer of the material temporarily is the crystalline state and said layer of the material becomes partially amorphous as a result of temperature distribution within the scanning light spot of the readout light.

3. The optical disc as claimed in claim 1 characterized in that the material of said layer of the material is a chalcogenide.

4. The optical disc as claimed in claim 1 characterized in that the material of said layer of the material is SbTe.

5. The optical disc as claimed in claim 1 characterized in that a first dielectric layer, the layer of the material and a second dielectric layer are sequentially formed on said transparent base plate.

6. The optical disc as claimed in claim 1 characterized in that a first dielectric layer, the layer of the material, a second dielectric layer and a reflective layer are sequentially formed on said transparent base plate.

* * * * *